US009462785B2

(12) United States Patent
Caston (10) Patent No.: US 9,462,785 B2
(45) Date of Patent: Oct. 11, 2016

(54) MULTI-PANEL ANIMAL BLANKET (71) Applicant: Misty Caston, Minneapolis, MN (US)

(72) Inventor: Misty Caston, Minneapolis, MN (US)

( * ) Notice: Subject to any disclaimer, the term of this patent is extended or adjusted under 35 U.S.C. 154(b) by 93 days.

(21) Appl. No.: 13/860,385

(22) Filed: Apr. 10, 2013

(65) Prior Publication Data

US 2013/0263561 A1  Oct. 10, 2013

Related U.S. Application Data (60) Provisional application No. 61/622,510, filed on Apr. 10, 2012.

(51) Int. Cl.
*A01K 13/00* (2006.01)
*B68B 7/00* (2006.01)
*B68C 5/00* (2006.01)

(52) U.S. Cl.
CPC ............. *A01K 13/008* (2013.01); *B68B 7/00* (2013.01); *B68C 5/00* (2013.01)

(58) Field of Classification Search
CPC .......... B68C 5/00; B68B 7/00; A01K 13/008
USPC .......................... 54/79.1, 79.2, 79.4; 119/850
See application file for complete search history.

(56) References Cited

U.S. PATENT DOCUMENTS

| | | | | |
|---|---|---|---|---|
| 134,921 A | * | 1/1873 | Morris | 54/79.1 |
| 233,275 A | * | 10/1880 | Osborn | 54/79.2 |
| 312,880 A | * | 2/1885 | McPherson | 54/79.2 |
| 340,332 A | * | 4/1886 | Lewis | 54/79.2 |
| 754,294 A | * | 3/1904 | Foglesong | 219/528 |
| 791,372 A | * | 5/1905 | Seaders | 54/79.2 |
| 812,796 A | * | 2/1906 | Kinder | 54/79.2 |
| 829,904 A | * | 8/1906 | Young | 54/79.2 |
| 838,310 A | * | 12/1906 | Evans | 54/79.2 |
| 935,166 A | * | 9/1909 | Rorabeck | A01K 13/008 54/79.2 |
| 2,400,781 A | * | 5/1946 | Priour | 54/79.1 |
| D250,138 S | | 10/1978 | Bartolac et al. | |
| 4,214,421 A | | 7/1980 | Battle et al. | |
| D265,516 S | | 7/1982 | Wacker | |
| 4,671,049 A | | 6/1987 | Benchkhuijsen | |
| 5,127,213 A | | 7/1992 | Petronio | |
| 5,271,211 A | * | 12/1993 | Newman | 54/79.2 |
| 5,361,563 A | | 11/1994 | Llamas | |
| 5,839,395 A | | 11/1998 | Kelley et al. | |
| 6,467,244 B1 | | 10/2002 | Kelley et al. | |

(Continued)

FOREIGN PATENT DOCUMENTS

GB  2399483 A  *  9/2004
WO  WO 03/067968 A1  8/2003

*Primary Examiner* — Son T Nguyen
(74) *Attorney, Agent, or Firm* — Schwegman Lundberg & Woessner, P.A.

(57) ABSTRACT

An animal blanket comprises a main body panel, an underbody panel and a set of fasteners. The main body panel drapes over a back of an animal, such as a horse. The underbody panel extends across a belly of the animal. The first set of fasteners releasably connect the main body panel and the underbody panel. In one embodiment, the main body panel comprises a barrel panel and a neck panel, and the underbody panel comprises a belly panel and a chest panel. A first side of the underbody panel is connected to the main body panel via the set of fasteners. In one embodiment, a second side of the underbody panel is also connected to the main body panel via the set of fasteners. In another embodiment, the second side of the underbody panel is connected to the main body panel via a stitched seam.

8 Claims, 6 Drawing Sheets

(56) References Cited

U.S. PATENT DOCUMENTS

| | | |
|---|---|---|
| 6,584,939 B1 | 7/2003 | Brezinski |
| 6,786,028 B1 | 9/2004 | Longtin |
| 6,877,300 B1 | 4/2005 | Hathcock |
| 7,219,486 B1 | 5/2007 | Conforth |
| 7,243,485 B2 | 7/2007 | Donahue |
| D577,867 S | 9/2008 | Lacov et al. |
| 7,637,087 B1 * | 12/2009 | Graham ............... A01K 13/008 54/79.1 |
| 2008/0110414 A1 | 5/2008 | Buehner |
| 2008/0134991 A1 | 6/2008 | DePass |
| 2008/0216454 A1 | 9/2008 | Lacow et al. |
| 2010/0050958 A1 | 3/2010 | Jackson et al. |

* cited by examiner

MULTI-PANEL ANIMAL BLANKET

CROSS-REFERENCE TO RELATED APPLICATION(S)

This application claims priority under 35 U.S.C. §119 to U.S. provisional application Ser. No. 61/622,510, entitled "Snuggler/Animal Blanket," filed Apr. 10, 2012 by Misty Caston, which is incorporated herein by this reference.

BACKGROUND

The present disclosure relates generally to blankets for animals. In one embodiment, the present disclosure relates to blankets that are used to wick moisture off of animals and/or to keep animals warm during a cool-down period after a workout. Animals, such as horses, usually sweat during and after a workout, even if the workout is mild. It is desirable, even necessary, to dry the animal off before releasing it back to its domicile in order to prevent the animal from becoming ill. In particular, horses that live in the outdoors or unheated barns need to be dried as much as possible before being returned to the outdoors in cold weather climates because horses cannot maintain a normal body temperature if their hair is wet and the temperatures are cool or cold. Therefore, blankets known as "coolers" are used to wick moisture away from the skin of the horse while providing immediate warmth. The wet blanket is subsequently removed from the horse before the horse is released to the outdoors.

Coolers are conventionally shaped as generally rectangular or contoured blankets that are draped over the back of the animal, and then secured to the animal using various straps, extensions or hoods. For example, U.S. Pat. No. 5,361,563 discloses a blanket having a belly wrap that extends across the underside of the blanket, and a front flap that is secured to the blanket using a girth strap. Such a belly wrap, however, only pulls the blanket around the belly, leaving large amounts of the underside of the animal exposed. Additionally, the front flap is a narrow strip that leaves much of the chest exposed, while also requiring connection of multiple straps and fasteners. This blanket is also designed to be put over the head of the horse, which is precarious at best and dangerous at worst. Similarly, U.S. Pat. No. 6,877,300 and U.S. Pub. No. 2008/0216454 disclose blankets that require straps to attempt to pull the side portions of the blanket towards the middle of the belly of the animal, leaving much of the belly exposed and requiring intricate positioning and tensioning of multiple straps. These and other garments, such as that described in U.S. Pat. No. 6,786,028, leave much or all of the chest and abdominal regions exposed, while requiring elaborate fastening systems. There is, therefore, a need for a more effective animal blanket that is easy to use and set up.

SUMMARY

The present invention is directed to an animal blanket that may be used for, among other things, a turn-out blanket, a cooler, a stable sheet, a dress sheet, or a fly-sheet. The animal blanket comprises a main body panel, an underbody panel and a set of fasteners. The main body panel drapes over a back of an animal, such as a horse. The underbody panel extends across a belly of the animal. The first set of fasteners releasably connect the main body panel and the underbody panel. In one embodiment, the main body panel comprises a barrel panel and a neck panel, and the underbody panel comprises a belly panel and a chest panel. A first side of the underbody panel is connected to the main body panel via the set of fasteners. In one embodiment, a second side of the underbody panel is also connected to the main body panel via the set of fasteners. In another embodiment, the second side of the underbody panel is connected to the main body panel via a stitched seam.

DETAILED DESCRIPTION

Figure 1:
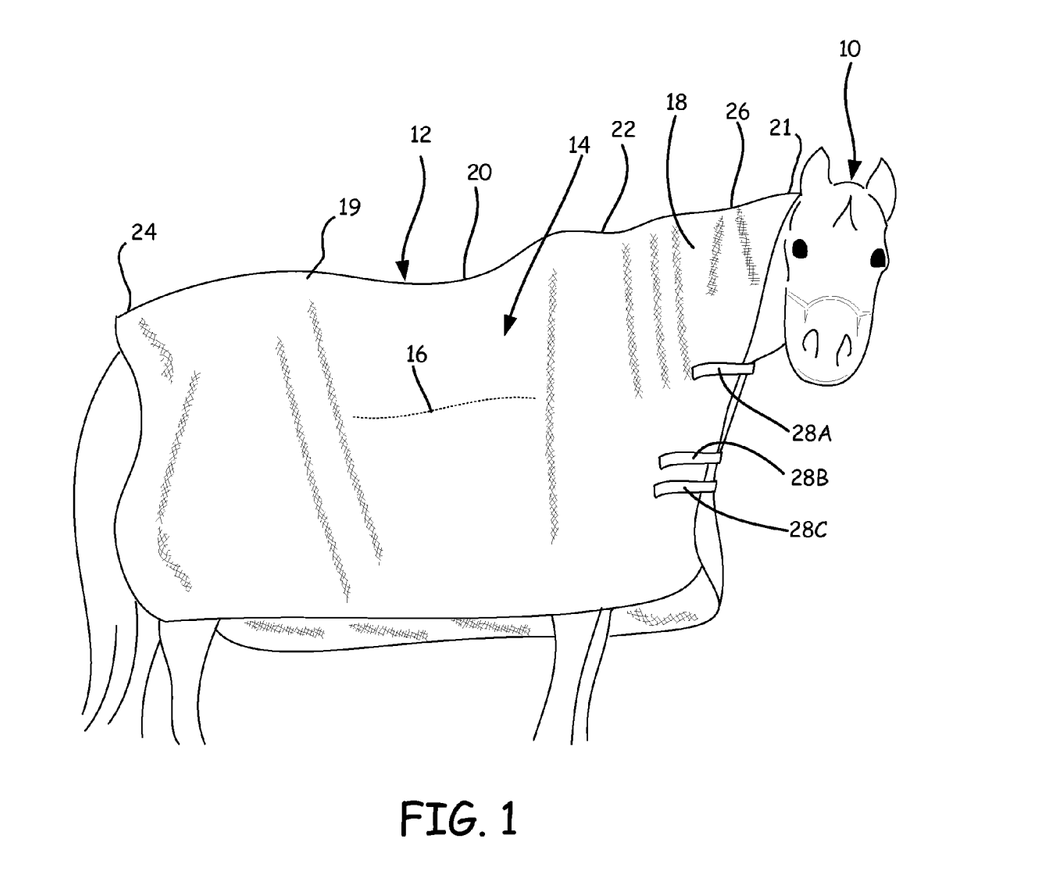
FIG. 1 is a perspective view of a horse wearing an animal blanket having a main body panel draped over a back of the horse and with which an underbody panel (not shown) can be used that extends along a chest and belly of the horse underneath the main body panel.

FIG. 1 is a perspective view of horse 10 wearing animal blanket 12 having main body panel 14 draped over the top of horse 10 and to which an underbody panel (not shown) that extends along the underside of horse 10 is attached at seam 16. FIG. 1 shows the off-side (right side of a horse using conventional mounting techniques) of horse 10, with the near-side (left side) being disposed opposite the off-side. Main body panel 14 includes neck portion 18 and back portion 19. Back portion 19 extends across back 20 between withers 22 and tail head 24. Neck portion 18 extends from withers 22 across neck 26 to poll 21. In other embodiments of blanket 12, neck portion 18 may be omitted from main body panel 14. Thus, main body panel 14 extends from poll 21 to tail head 24. The underbody panel includes a belly portion and a chest portion (See FIGS. 2-6), which extend across the belly and chest of horse 10, respectively. Although described with respect to horse 10, animal blanket 12 may be configured for use with other quadruped animals, such as dogs, cows, goats and the like.

In various embodiments, animal blanket 12 is configured to protect the animal from different conditions. For example, animal blanket 12 can be fabricated from a moisture-wicking material to function as a cooler that draws sweat away from the animal after a workout, or moisture of any kind for any reason. In such embodiments, animal blanket 12 may be fabricated from moisture-wicking materials such as wool, fleece, cotton and the like. In another embodiment, animal blanket 12 can be fabricated from insulating material to function as a turn-out blanket for providing warmth to the animal in cold climates. In such embodiments, animal blanket 12 may be fabricated from insulating materials, such as polyester, nylon and the like. In yet another embodiment, animal blanket 12 may be fabricated from a mesh material to function as a fly-sheet to shield the animal from insect bites, such as from mosquitoes. In such embodiments, animal blanket 12 may be fabricated from polyester mesh, nylon mesh and the like.

In the depicted embodiment, animal blanket 12 is configured as a walking blanket wherein main body panel 14 forms skirt that extend below belly-level, elbow-level and hock-level of the animal. Such a configuration provides additional protection to the animal, but produces dangling material that can be caught or snagged, which may risk injury to the animal. Thus, in other embodiments, animal blanket 12 may be configured as a contoured blanket wherein main body panel 14 extends to just below the belly of the animal and is more fitted to the shape of the animal.

Main body panel 14, including neck portion 18 and back portion 19, is positioned over horse 10 to cover its back, neck and sides. Neck portion 18 includes straps 28A-28C that are used to pull neck portion 18 around the underside of neck 26 when main body panel 14 is draped over back 20. Straps 28A, 28B and 28C may be secured using various types of fasteners, such as hook and loop fastener material, parachute clips and the like. Additional straps and fasteners not shown may also be used to provide a more secure fit and additional materials such as polyester, nylon, rope and the like may be used for straps. Main body panel 14 covers a substantially larger amount of surface area of the body of horse 10 as compared to other conventional animal coverings, thereby decreasing drying time and adding critical areas of protection for horse 10. Furthermore, other conventional horse blankets, coolers and fly sheets typically leave the underbody surfaces of the animal exposed. The animal blanket of the present disclosure includes an underbody panel which is comprised of a belly portion and a chest portion to protect and dry the belly and chest of the animal.

Figure 2:
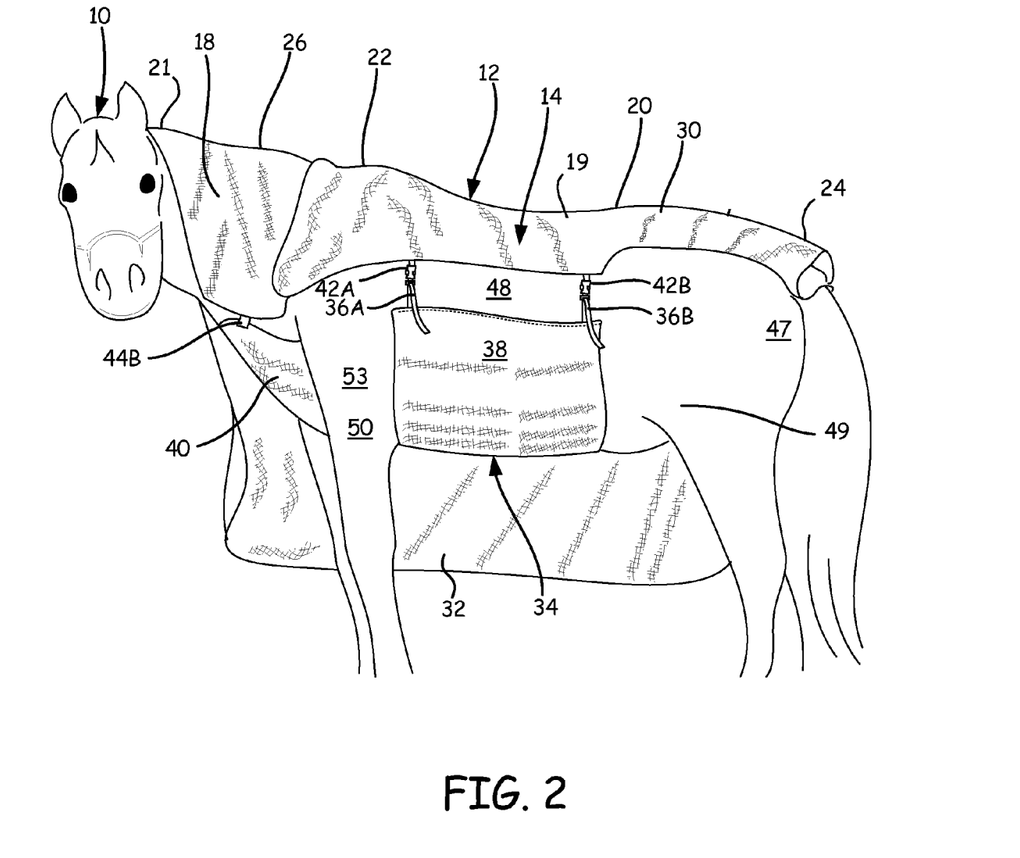
FIG. 2 is a perspective view of the horse of FIG. 1 showing a near-side of the main body panel lifted over the back of the horse to show an off-side behind the horse and an underbody panel attached below the main body panel via straps.
Figure 3:
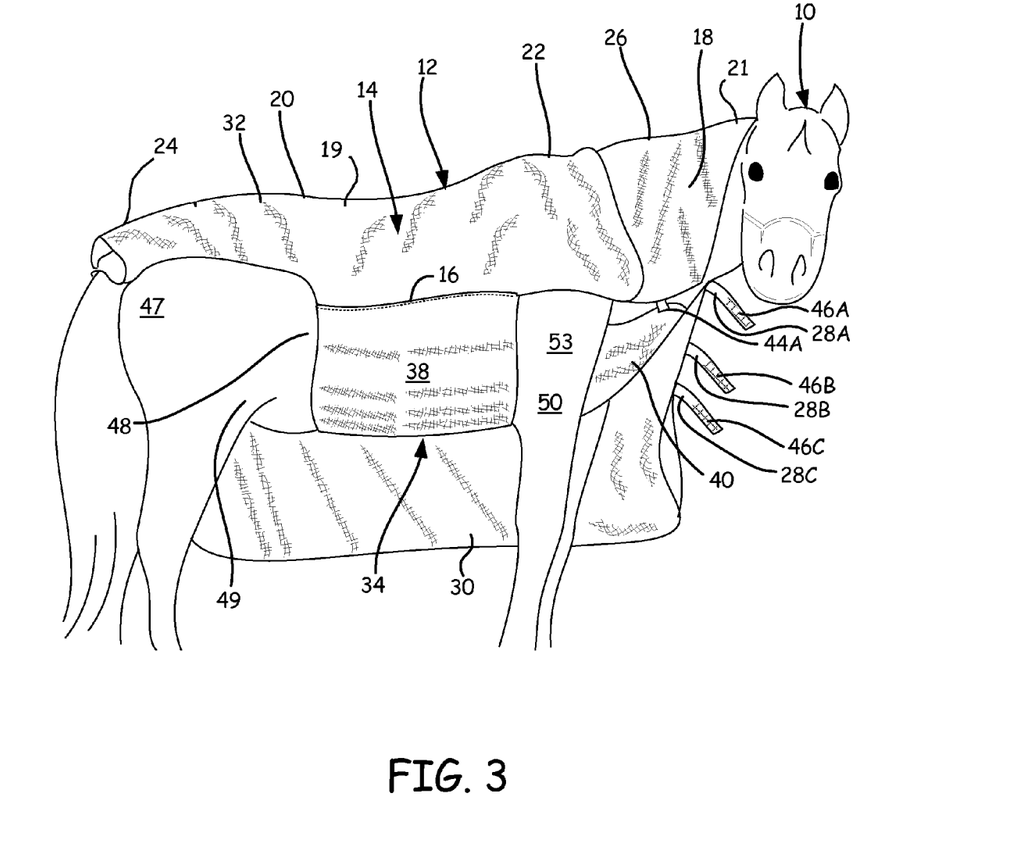
FIG. 3 is a perspective view of the horse of FIG. 1 showing the off-side of the main body panel lifted over the back of the horse to show the near-side behind the horse and the underbody panel attached below the main body panel via a stitched seam.

FIG. 2 is a perspective view of horse 10 of FIG. 1 showing near-side 30 of main body panel 14 lifted over back 20 of horse 10 to show off-side 32 of main body panel 14 and underbody panel 34 attached under main body panel 14 via straps 36A and 36B. FIG. 3, which is discussed concurrently with FIG. 2, is a perspective view of horse 10 of FIG. 1 showing off-side 32 of main body panel 14 lifted over back 20 of horse 10 to show near-side 30 of main body panel 14 and underbody panel 34 attached under main body panel 14 via seam 16. Underbody panel 34 includes belly panel 38 and chest panel 40. Straps 36A and 36B (FIG. 2) connect belly panel 38 to near-side 30 of main body panel 14 using fasteners 42A and 42B. Seam 16 (FIG. 3) connects belly panel 38 to off-side 32 of main body panel 14. Strap 44B (FIG. 2) connects chest panel 40 to neck portion 18 proximate near-side 30 of main body panel 14. Strap 44A (FIG. 3) connects chest panel 40 to neck portion 18 proximate off-side 32 of main body panel 14. Straps 44A and 44B may alternatively connect to back portion 19 of main body panel 14 in embodiments where neck portion 18 is omitted.

As shown, neck portion 18 covers the top and sides of neck 26. Straps 28A-28C (FIG. 3) can be drawn tight around the underside of neck 26 and secured using fasteners 46A-46C to cover the under side of neck 26. Fasteners 46A-46C may comprise any suitable type of fastener, such as hook and loop fastener material, parachute clips and the like. Fasteners 46A-46C may be configured to link straps 28A-28C of near-side 30 of main body panel 14 with straps 28D-28F (FIG. 5) of off-side 32 of main body panel 14.

Back portion 19 and neck portion 18 of main body panel extend along back 20 and portions of neck 26 to provide covering to poll 21, neck 26, withers 22, back 20 and croup 24. Back portion 19 connects to neck portion 18 at a forward end, and extends aftward to cover the dock and buttock 47 of horse 10. Neck portion 18 connects to back portion 19 at an aft end, and extends forward to cover neck 26 of horse 10. In other embodiments of the invention, neck portion 18 may be omitted from blanket 12. Off-side 32 of main body panel 14 drapes down from back 20 and covers the shoulder, forearm 53, barrel 48, flank and buttock 47 of horse 10 on the off-side of horse 10. Similarly, near-side 30 of main body panel 14 drapes down from back 20 and covers the shoulder, forearm 53, barrel 48, flank and buttock 47 of horse 10 on the near-side of horse 10. As such, main body panel 14, including neck portion 18, provides excellent protection to the outer exposed surfaces of horse 10. Main body panel 14 is additionally easy to install and minimally restricting on movement of horse 10.

Underbody panel 34 connects to main body panel 14 to provide protection to surfaces of horse 10 left exposed by main body panel 14. As shown in FIG. 3, seam 16 connects belly panel 38 to off-side 32 of main body panel 14, while straps 36A and 36B connect belly panel 38 to near-side 30 of main body panel 14, as shown in FIG. 2. Belly panel 38 is wide (left to right) enough to extend all the way across belly of horse 10 and up to the sides of barrel 48 of horse 10. As such, belly panel 38 partially overlaps with the skirts formed by near-side 30 and off-side 32 of main body panel 14 underneath main body panel 14 when near-side 30 and off-side 32 are draped from back 20, thereby concealing belly panel 38 underneath main body panel 14. Belly panel 38 is long (fore to aft) enough to extend from proximate flanks 49, across the belly and barrel 48 to proximate elbows 50 of horse 10. Chest panel 40 extends from belly panel 38, between forearms 53, across the chest to proximate the underside of neck 26. Straps 44A and 44B connect chest panel 40 to main body panel 14. In particular, straps 44A and 44B extend from chest panel 40 to neck portion 18 of main body panel 14, or back portion 19 if neck portion 18 is omitted. Constructed as such, belly panel 38 and chest panel 40 extend contiguously, and underbody panel 34 extends continuously, from proximate flanks 49, across the belly of barrel 48, between forearms 53 and across the chest to proximate neck 26.

Underbody panel 34 provides protection to the surfaces of horse 10 left exposed by main body panel 14. For example, the area of horse 10 between the chest and the belly, such as the area between forearms 53, is an area where perspiration collects after a workout. Perspiration from neck 26 and forearms 53 collects in the area between forearms 53. Thus, it is important to remove moisture from this area before releasing horse 10 back to a cold outdoor environment. Prior art cooling blankets leave this area exposed, thus risking the health of the horse unless the owner manually dries the area between the forearms with a towel. Conversely, underbody panel 34 of blanket 12 provides protection to horse 10 in this vital area without unduly increasing the complexity and installation process of blanket 12.

Figure 4:
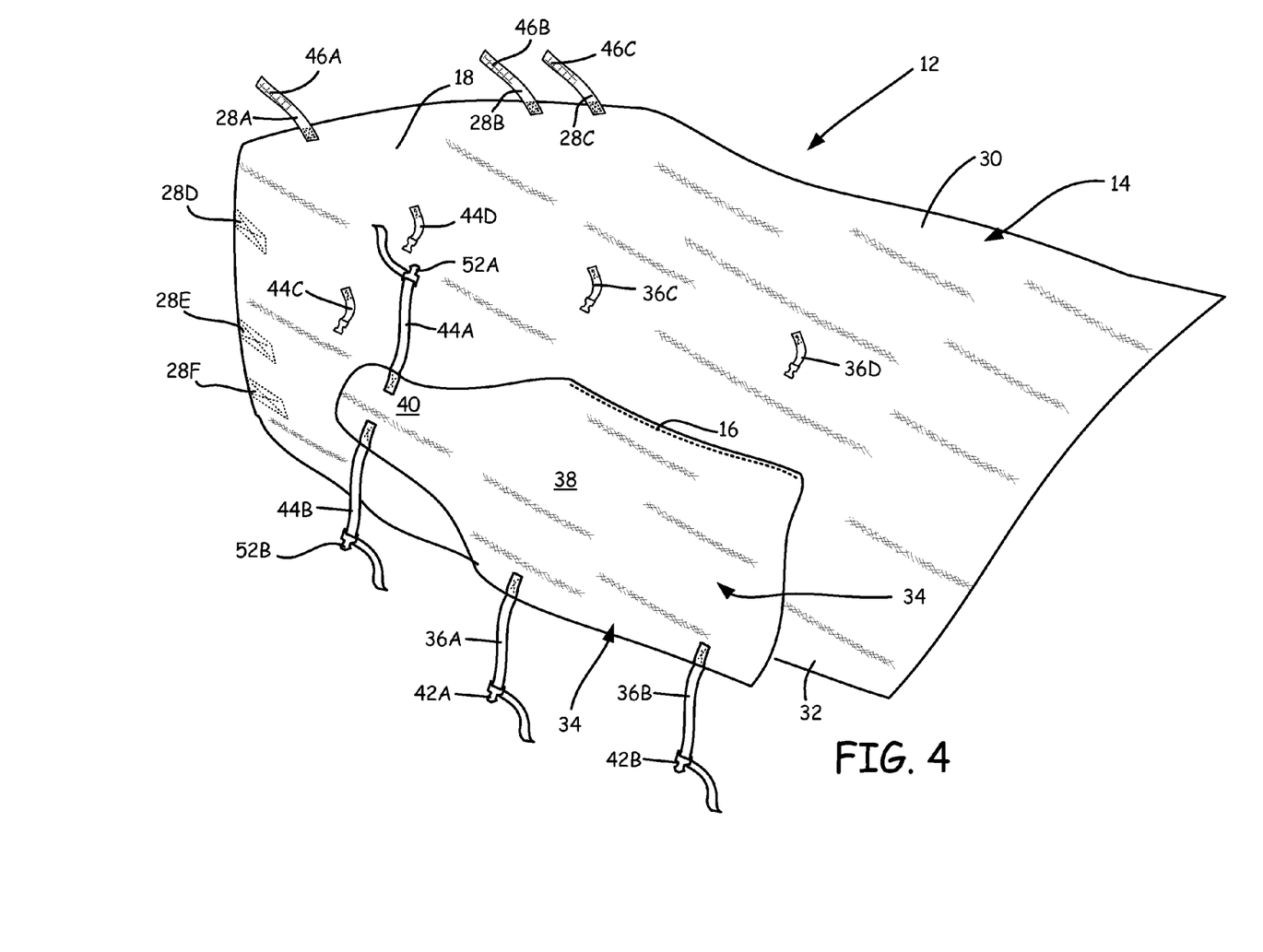
FIG. 4 is perspective view of the animal blanket of FIG. 1 looking underneath the main body panel with the underbody panel hanging down at a stitched seam.

FIG. 4 is perspective view of animal blanket 12 of FIG. 1 looking underneath main body panel 14 with underbody panel 34 hanging down at seam 16. In addition to the features described with reference to FIGS. 1-3, blanket 12 additionally includes straps 36C and 36D, straps 44C and 44D, and fasteners 52A and 52B. Fasteners 52A and 52B may comprise any suitable type of fastener, such as hook and loop fastener material, parachute clips and the like. FIG. 4 depicts blanket 12 in a state as if main body panel 14 was spread out over back 20 of horse 10 such that underbody panel 34 would hang below main body panel 14 alongside barrel 48, without horse 10 being shown. Underbody panel 34 connects to main body panel 14 to provide protection to surfaces of horse 10 left exposed by main body panel 14.

Main body panel 14 is spread out such that neck portion 18 extends forward from near-side 30 and off-side 32 of main body panel 14. When draped over horse 10, near-side 30 and off-side 32 of main body panel 14 will hang down to oppose each other. Straps 28A-28C extend forward from neck portion 18 on the near-side and are configured to mate with straps 28D-28F on the off-side. Underbody panel 34 extends down from off-side 32 of main body panel 14 at seam 16. In one embodiment, seam 16 comprises threaded stitching wherein belly panel 38 is sewn to off-side 32 of main body panel 14. However, in other embodiments, seam 16 may be formed by sewing an intermediate strip between belly panel 38 and off-side 32 of main body panel 14, or by connecting with other means, such as glue or hook and loop fastener material. In various embodiments, seam 16 forms an internal (e.g. within main body panel 14) hinge along which underbody panel 34 can be easily rotated to bring straps 36A and 36B into engagement with straps 36C and 36D. The hinge forms a permanent or semi-permanent attachment that conveniently positions belly panel 38 along off-side 32 of main body panel 14 for convenient storage and installation. In yet other embodiments, seam 16 may be replaced via fasteners such as parachute clips.

Straps 36A and 36B are configured to connect with straps 36C and 36D, respectively, located on near-side panel 30 of main body panel 14. Thus, FIG. 4 depicts blanket 12 in a state where main body panel 14 is draped over horse 10 such that seam 16 and fasteners 36C and 36D straddle back 20. Thus, underbody panel 34 dangles down and is ready to be wrapped around the belly of horse 10. Straps 36A and 36B will dangle in a position that can be easily reached, such as between the fore and aft legs of horse 10, by an operator when blanket 12 is draped over horse 10. Fasteners 42A and 42B can be used to couple strap 36A with strap 36C, and strap 36B with strap 36D, respectively. Fasteners 42A and 42B can be adjusted so that belly panel 38 fits snugly around barrel 48 and the belly of horse 10. Subsequently, straps 44A and 44B can be extended to connect with straps 44C and 44D using fasteners 52A and 52B, respectively. Thus, chest panel 40 will be brought between forearms 53 of horse 10 and straps 44A and 44B will extend along the base of neck 26, as shown in FIGS. 2 and 3. Fasteners 52A and 52B can be adjusted so that chest panel 40 fits snugly against the chest of horse 10. As described herein, underbody panel 34 is easily installed underneath main body panel 14 with minimal adjustment of straps, fasteners and the like, thereby minimizing risk of injury to the horse and the installer of blanket 12.

Figure 5:
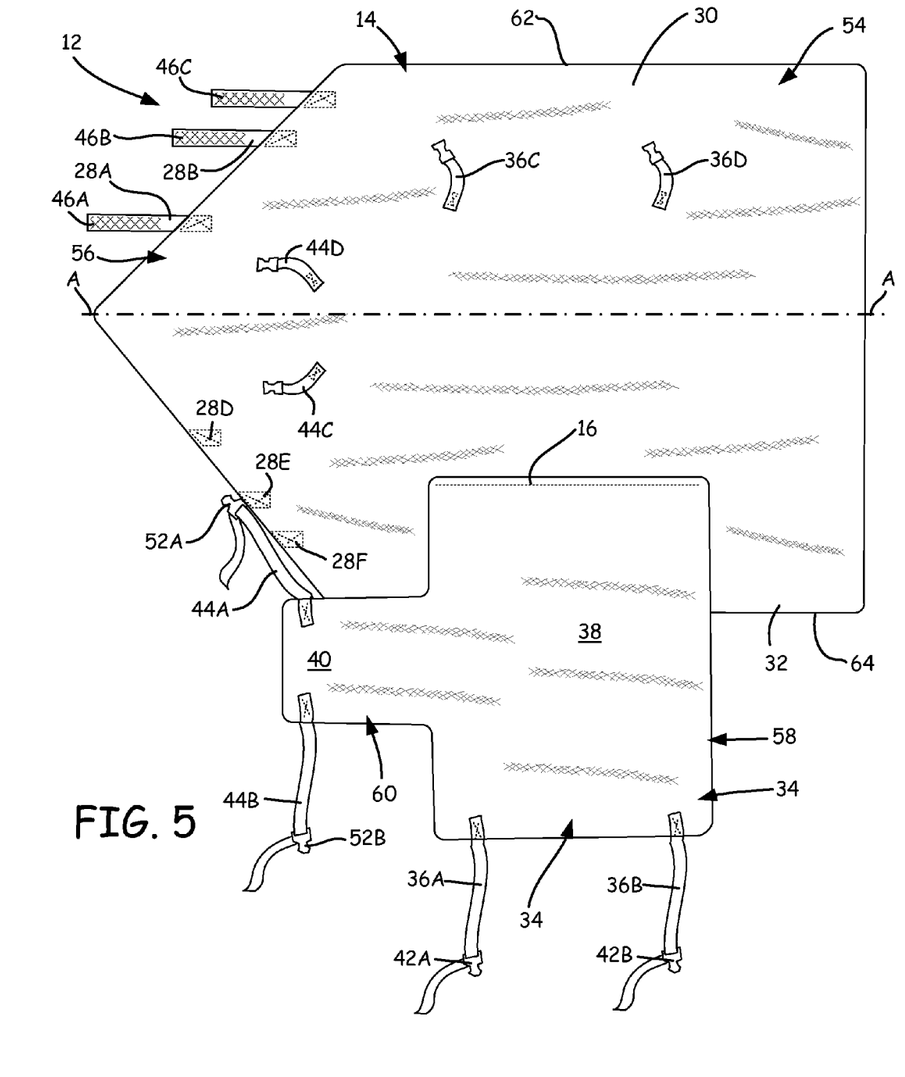
FIG. 5 is a plan view of the underside of the animal blanket of FIG. 1 showing the underbody panel laid out flat on top of the main body panel.

FIG. 5 is a plan view of the underside of animal blanket 12 of FIG. 1 showing underbody panel 34 laid out flat on top of main body panel 14. Animal blanket 12 of FIG. 5 includes all of the same features, labeled with like reference numbers, as is described with reference to FIGS. 1-4. Main body panel 14 comprises rectangular portion 54 that forms near-side 30 and off-side 32 of main body panel 14, and triangular portion 56 that forms neck portion 18. Rectangular portion 54 and triangular portion 56 can extend contiguously from each other, as shown in FIGS. 4 and 5, so as to be formed of the same sheet of material. As mentioned, neck portion 18 may be omitted such that blanket 12 comprises a rectangle. Underbody panel 34 comprises first rectangular portion 58 that forms belly panel 38, and second rectangular portion 60 that forms chest panel 40. First rectangular portion 58 and second rectangular portion 60 can extend contiguously from each other, as shown in FIGS. 4 and 5, so as to be formed of the same sheet of material. Although described with reference to triangular and rectangular shaped panels, blanket 12 may use other rectilinear or polygonal shapes, or shapes having rounded edges in various embodiments.

Rectangular portion 54 forms a barrel panel or back panel of main body panel 14 that covers back 20 and portions of barrel 48 of horse 10. Rectangular portion 54 extends along axis A such that approximately equal amounts of main body panel 14 extend to form near-side 30 and off-side 32 of main body panel 14. Axis A extends along a portion of main body panel 14 that extends across the spine of horse 10 along back 20. Triangular portion 56 is centered on rectangular portion 54 such that axis A extends through the apex of the triangle. Thus, axis A also extends along the spine of horse 10 along neck 26.

In the depicted embodiment, straps 28A-28C and 28D-28F extend axially from triangular portion 56 at radial intervals. Specifically, straps 28A and 28D are positioned nearer to axis A so as to be positioned close to the throatlatch of horse 10, while straps 28B, 28C, 28E and 28F are positioned further away from axis A so as to extend across the chest of horse 10. Straps 28A-28C comprise elongate lengths of material, such as nylon webbing, polyester webbing, rope cord and the like, so as to be able to extend across straps 28D-28F, which comprise strips of material for mating with straps 28A-28C. In one embodiment, fasteners 46A-46C comprise hook and loop fastener material wherein straps 28A-28C and straps 28D-28F are provided with opposite fabrics of the hook and loop fastener material, respectively, so that neck portion 18 can be drawn snuggly around the underside of neck 26 of horse 10. In other embodiments, straps 28A-28F may have other orientations.

Straps 44C and 44D are spaced equally from axis A on triangular portion 56. Straps 36C and 36D are positioned on rectangular portion 54 approximately halfway between axis A and edge 62, with the pair being centered axially on rectangular portion 54. Similarly, seam 16 is positioned on rectangular portion 54 approximately halfway between axis A and edge 64, with seam 16 being centered axially on rectangular portion 54. Straps 44C and 44D and straps 36C and 36D are positioned to align with mating straps on underbody panel 34.

First rectangular portion 58 of underbody panel 34 is joined to rectangular portion 54 at seam 16. First rectangular portion 58 is approximately half as long as rectangular portion 54 with respect to axis A and is thus configured to fit between the fore and aft legs (between forearms 53 and flanks 49) of horse 10. First rectangular portion 58 is approximately three-quarters the width of rectangular portion 54 with respect to the distance between edges 62 and 64 so as to be able to wrap around barrel 48 and the belly of horse 10. Underbody panel 34 can be flipped to be positioned over (with reference to FIG. 5) main body panel 14 such that belly panel 38 and chest panel 40 extend along center axis A and cover the center spot (i.e. between edges 62 and 64, and along axis A within blanket 12) of rectangular portion 54 and underbody panel 34 and blanket 12.

The placement of seam 16 and straps 36C and 36D at their respective positions between edges 62 and 64 allows underbody panel 34 and main body panel 14 to completely encircle barrel 48 of horse 10, while also allowing portions of belly panel 38 to overlap with portions of near-side 30 and off-side 32 inside of main body panel 14 when near-side 30 and off-side 32 hang down from axis A. As such, underbody panel 34 in conjunction with main body panel 14 provide advantages over prior art blankets by fully covering the barrel, belly and chest areas of the animal. The increased area of protection and drying surface for the animal can be achieved with minimal installation effort for underbody panel 34, thereby reducing risk of injury to the animal and to the caregiver of the animal when putting blanket 12 on the animal. Furthermore, underbody panel 34 does not interfere with the fit and installation of main body panel 14. For example, drawing-in of the side sheets of a conventional horse blanket, as is done in U.S. Pat. Nos. 5,361,563, 6,877,300 and U.S. Pub. No. 2008/0216454, restricts movement of the legs of the animal and therefore risks injury to the animal produced by imbalance, constrained movement, etc. Furthermore, the side sheets of the aforementioned references are typically not long enough to overlap and completely encircle the belly when drawn in. Underbody panel 34 of the animal blanket described herein, however, does not interfere with the legs and also does not induce main body panel 14 to interfere with the legs, partly because undepanel 34 is located within, rather than outside of, main body panel 14.

Figure 6:
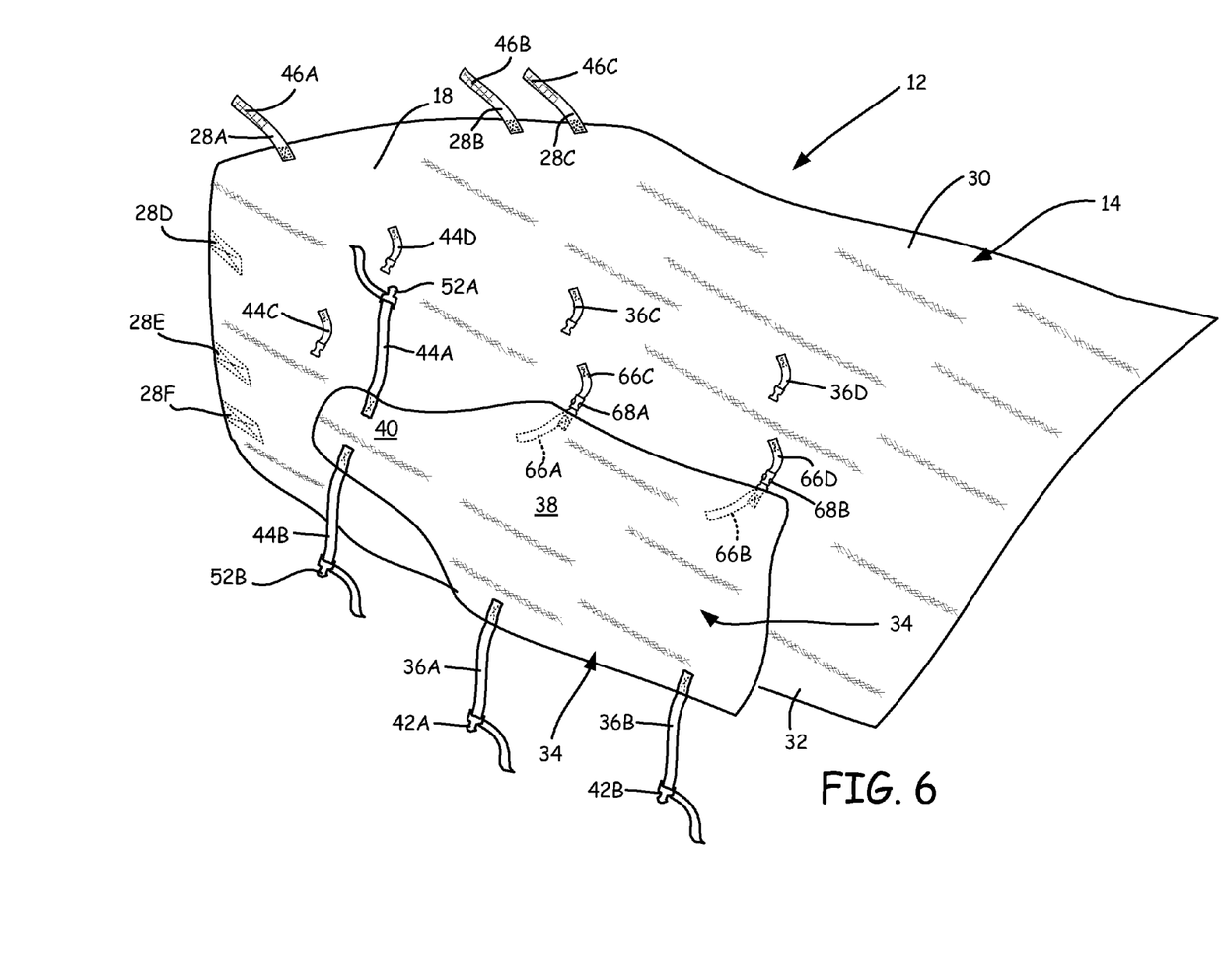
FIG. 6 is perspective view of second embodiment of the animal blanket of FIG. 1 looking underneath the main body panel with the underbody panel hanging by fasteners.

FIG. 6 is perspective view of second embodiment of animal blanket 12 of FIG. 1 looking underneath main body panel 14 with underbody panel 34 hanging by fasteners 68A and 68B. Animal blanket 12 of FIG. 6 includes all of the same features, labeled with like reference numbers, as is described with reference to FIGS. 1-5, except seam 16 is replaced by straps 66A-66D and fasteners 68A and 68B. Straps 66A and 66B are positioned on belly panel 38 opposite straps 36A and 36B Likewise, straps 66C and 66D are positioned on off-side 32 so as to mirror straps 36C and 36D on near-side 30. Fasteners 68A and 68B join straps 66A and 66C and straps 66B and 66D, respectively, such that underbody panel 34 can be suspended under main body panel 14. Thus, the embodiment of FIG. 6 performs substantially similarly to the embodiment of FIG. 4 when installed, but allows underbody panel 34 to be completely removed. Thus, underbody panel 34 can be cleaned separate from main body panel 14 or can be replaced without having to replace all of blanket 12. Further, underbody panel 34 can be sold as a separate accessory for main body panel 14.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An animal blanket comprising:
   a main body panel for draping over a back of an animal, the main body panel comprising:
      a first rectilinear portion for extending across the back and draping past elbows of the animal continuously between a withers and a tail head of the animal; and
      a triangular portion extending continuously from the first rectilinear portion for extending across a neck of the animal from a withers to a poll of the animal;
   wherein the first rectilinear portion and the triangular portion are formed from a first contiguous sheet of material;
   an underbody panel for extending across an underside of the animal, the underbody panel comprising:
      a second rectilinear portion for extending across a belly of the animal; and
      a third rectilinear portion extending continuously from the second rectilinear portion for extending across a chest of the animal;
   wherein the second rectilinear portion and the third rectilinear portion are formed from a second contiguous sheet of material;
   a first set of fasteners that releasably connect the main body panel and the underbody panel;
   a first set of straps connecting the main body panel and the underbody panel to the first set of fasteners along a first side of the underbody panel;
   a permanent seam that acts as a hinge connecting an inner surface of the main body panel and an outer surface of the underbody panel along a second side of the underbody panel;
   a second set of fasteners that releasably connect the triangular portion to the third rectilinear portion; and
   a second set of straps connecting the triangular portion and the third rectilinear portion.

2. The animal blanket of claim 1 wherein the second rectilinear portion is connected to the first rectilinear portion such that, when laid flat atop each other, the underbody panel covers a center point of the main body panel and the third rectilinear portion extends into the triangular portion.

3. The animal blanket of claim 1 wherein the second contiguous sheet of material is configured to extend continuously lengthwise across the animal from proximate a hindquarters, across a belly, between forearms, across a chest to proximate a neck of the animal when the animal blanket is mounted on the animal.

4. The animal blanket of claim 1 wherein the first set of fasteners is selected from the group consisting of: hook and loop fasteners and parachute clips.

5. The animal blanket of claim 1 wherein the main body panel and the underbody panel are completely fabricated from a moisture wicking material comprising fleece.

6. The animal blanket of claim 1, further comprising a third set of fasteners that releasably connect a first portion of the triangular portion to an opposite, second portion of the triangular portion.

7. A horse blanket comprising:
   a main body panel comprising:
      a back portion extending between a withers-end and a tail head-end;
      first and second side panels extending contiguously from the back portion between the withers-end and the tail head-end to form skirts that drape below a belly level; and
      a triangular neck portion extending contiguously from the back portion and the first and second side panels at the withers-end to a poll-end of the horse blanket wherein the back portion, the first and second side panels, and the triangular neck portion are formed from a first contiguous sheet of material;
   an underbody panel coupled to the first side panel at a first connection, the underbody panel comprising:
      a belly panel configured to extend opposite the back portion; and
      a chest panel contiguously from the belly panel, wherein the chest panel is configured to extend opposite the triangular neck portion wherein the belly panel and the chest panel are formed from a second contiguous sheet of material;

a set of straps that connect a first edge of the triangular neck portion to a second, opposite edge of the triangular neck portion via hook and loop fasteners;

a seam forming the first connection that forms a hinge between the belly panel and the first side panel underneath the main body panel;

a first pair of straps forming a second connection that connects the belly panel and the second side panel underneath the main body panel via a first pair of fasteners comprising parachute clips; and a second pair of straps that connect a withers-end portion of the chest panel to the triangular neck portion via a second pair of fasteners comprising parachute clips;

wherein the main body panel and the underbody panel are fabricated from a moisture-wicking material comprising polyester.

8. The horse blanket of claim 7, further comprising: a third set of releasable fasteners connecting a first portion of the triangular neck portion to an opposite, second portion of the triangular neck portion.

\* \* \* \* \*